United States Patent
Thomas et al.

(10) Patent No.: US 7,478,827 B2
(45) Date of Patent: Jan. 20, 2009

(54) LAMINATED BACKING FOR CONTAINING FRAGMENTS OF A FRACTURED TRIM COVER DURING DEPLOYMENT OF A PASSENGER RESTRAINT

(75) Inventors: Andrew Patrick Thomas, Northville, MI (US); Chi Li, Northville, MI (US); Justin Lee Healy, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1051 days.

(21) Appl. No.: 10/248,977

(22) Filed: Mar. 6, 2003

(65) Prior Publication Data

US 2004/0173999 A1   Sep. 9, 2004

(51) Int. Cl.
 *B60R 21/215* (2006.01)
(52) U.S. Cl. .................................... 280/728.3
(58) Field of Classification Search .............. 280/728.2, 280/728.3, 730.2, 732
See application file for complete search history.

(56) References Cited

U.S. PATENT DOCUMENTS

| | | | |
|---|---|---|---|
| 4,246,213 A * | 1/1981 | Takamatsu et al. .......... 264/46.7 |
| 4,246,303 A * | 1/1981 | Townsend ..................... 428/31 |
| 4,508,774 A * | 4/1985 | Grabhoefer et al. ......... 428/220 |
| 4,572,856 A * | 2/1986 | Gembinski ................... 428/71 |
| 5,322,324 A * | 6/1994 | Hansen et al. ............... 280/732 |
| 5,340,148 A * | 8/1994 | Faigle et al. ............. 280/730.2 |
| 5,372,379 A   | 12/1994 | Parker |
| 5,549,324 A * | 8/1996 | Labrie et al. ............. 280/728.3 |
| 5,560,646 A * | 10/1996 | Gray et al. ............... 280/728.3 |
| 5,580,651 A * | 12/1996 | Kerman .................... 428/318.4 |
| 5,632,914 A * | 5/1997 | Hagenow et al. ....... 219/121.71 |
| 5,673,931 A * | 10/1997 | Gray et al. .............. 280/728.3 |
| 5,721,046 A * | 2/1998 | Shrewsburg et al. ..... 428/304.4 |
| 5,783,016 A * | 7/1998 | Gallagher et al. ........... 156/214 |
| 5,863,063 A * | 1/1999 | Harrell .................... 280/730.2 |
| 5,863,064 A   | 1/1999 | Rheinlander et al. |
| 6,003,274 A * | 12/1999 | Wycech ....................... 52/232 |
| 6,079,732 A   | 6/2000 | Nakajima et al. |
| 6,079,733 A * | 6/2000 | Towler .................... 280/728.3 |
| 6,096,403 A * | 8/2000 | Wycech ....................... 428/122 |
| 6,113,131 A * | 9/2000 | Uehara et al. ............ 280/728.3 |
| 6,142,506 A   | 11/2000 | Patel et al. |
| 6,168,186 B1  | 1/2001 | Welch et al. |
| 6,179,324 B1  | 1/2001 | White, Jr. et al. |
| 6,234,515 B1  | 5/2001 | Iwanaga |
| 6,328,333 B1  | 12/2001 | Patel et al. |
| 6,440,514 B1* | 8/2002 | Ueno et al. ................... 428/43 |
| 6,451,398 B1* | 9/2002 | Sylvester ................... 428/41.8 |

(Continued)

*Primary Examiner*—Faye M. Fleming
*Assistant Examiner*—Laura Freedman
(74) *Attorney, Agent, or Firm*—Dickinson Wright PLLC; Greg Brown

(57) ABSTRACT

A trim cover (14) fabricated of synthetic material that has a temperature-sensitive fragmentation characteristic fractures as a passenger restraint is deployed through a wall of the trim cover. A laminated backing (16) disposed on a back face of the trim cover wall contains fragments of the wall resulting from its fracturing by the deploying restraint. The laminated backing has a stretchable foam layer (18) having a front face adhered to the back of the wall and a non-tearable layer (20) that has a front face adhered in covering relation to a back face of the stretchable foam layer and that does not tear as a result of the fracturing of the wall by the deploying restraint.

6 Claims, 3 Drawing Sheets

U.S. PATENT DOCUMENTS

| | | | |
|---|---|---|---|
| 6,552,095 B1 * | 4/2003 | Tochioka et al. | 521/54 |
| 2002/0043788 A1 * | 4/2002 | Gallagher et al. | 280/728.3 |
| 2002/0135161 A1 * | 9/2002 | Lamb et al. | 280/728.3 |
| 2003/0082967 A1 * | 5/2003 | Popp | 442/30 |
| 2003/0085555 A1 * | 5/2003 | Segura | 280/728.3 |
| 2004/0164531 A1 * | 8/2004 | Riha et al. | 280/732 |

* cited by examiner

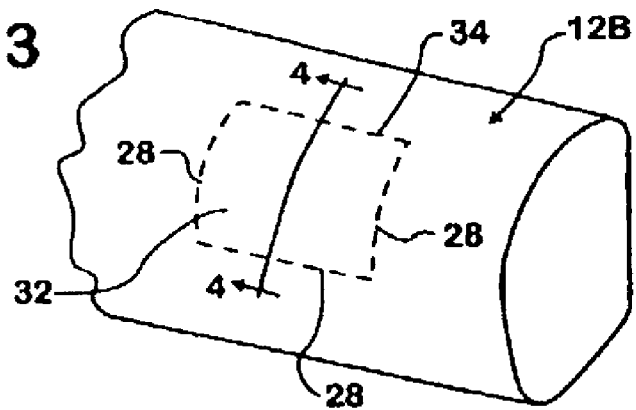
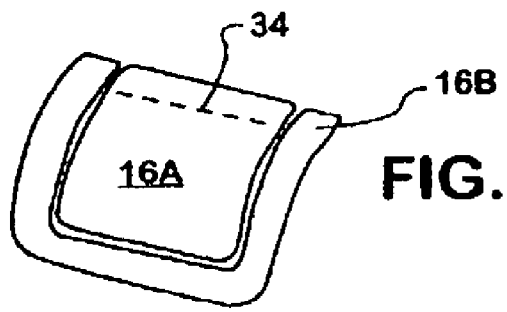
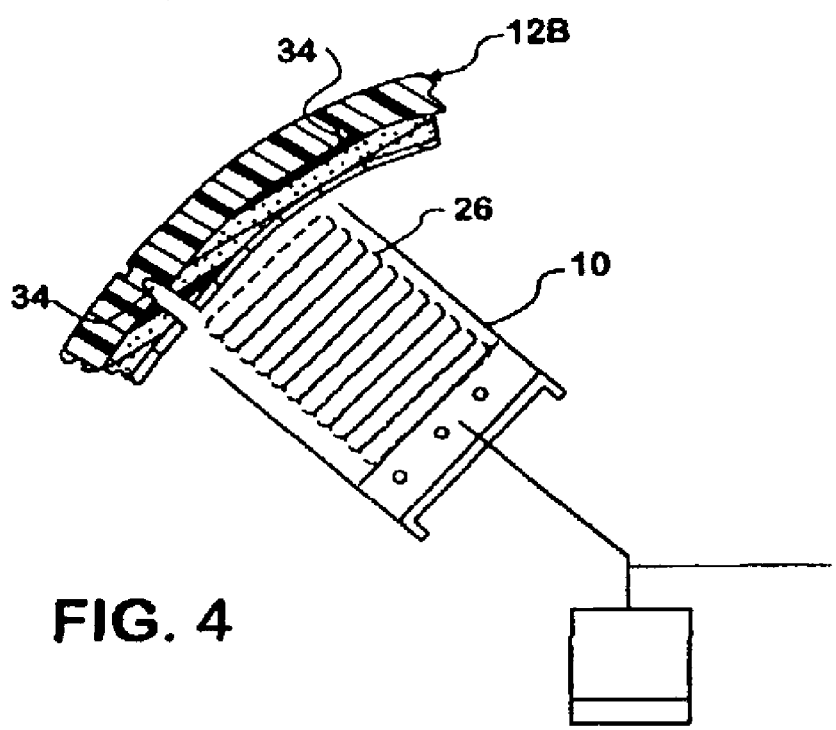

LAMINATED BACKING FOR CONTAINING FRAGMENTS OF A FRACTURED TRIM COVER DURING DEPLOYMENT OF A PASSENGER RESTRAINT

BACKGROUND OF INVENTION

1. Field of the Invention

This invention relates to vehicles having deployable passenger restraints, such as front air bags, seat-mounted air bags, door-mounted air bags, and side air curtains, that are concealed by synthetic trim covers through which the restraints are deployed in consequence of a condition, such as a crash, calling for restraint deployment. Forces exerted on the trim covers by restraint deployments fracture the trim covers along lines of weakness to create openings through which the restraints are deployed. This invention is particularly concerned with improvements for containment of fragments of fractured trim covers during deployment of the restraints through the trim covers, so that the fragments are not scattered into the interior of the passenger compartment.

2. Background Information

The state of the art is reflected by U.S. Pat. Nos. 5,372,379; 5,480,939; 5,863,064; 6,079,732; 6,142,506; 6,168,186; 6,179,324; 6,234,515; and 6,328,333 that were developed during a preliminary novelty search and that disclose various forms of trim covers through which various forms of deployable passenger restraints are deployed in motor vehicle crash situations. It is known to fabricate such trim covers from synthetic materials using known processes, such as plastic molding. It is also known to fabricate such trim covers with lines of weakness along which they will fracture as a result of restraint deployment forces acting on them as the restraints are being deployed through them.

Because such trim covers are disposed within the interiors of the passenger compartments of motor vehicles that are potentially subjected to a range of temperature extremes, it is desirable that the physical characteristics of the synthetic materials used in their manufacture be as stable as possible when subjected to environments where temperatures can range from polar cold to tropical desert heat. Certain known materials that possess such characteristics may be prohibitively costly for such use in an industry where piece cost is always a consideration in choosing a final design. Hence, the use of less costly synthetic materials is preferred, but not at the expense of compromising desired functionality.

One concern with some materials is that they may become brittle at very cold temperatures, such as ones approaching −40° C. At such temperatures, portions of a trim cover made of such a material may fragment as the trim cover is being fractured by a deploying air bag, and such fragmentation is generally considered unacceptable. Consequently, a known solution for resisting cold-temperature fragmentation comprises placing an electric heater element in proximity to the trim cover to keep its temperature above those where it might otherwise become prone to fragmentation upon fracture. In addition to its heater elements, that solution of course involves added electric circuits that must draw power from the vehicle electrical system. It would be better if such complications could be avoided.

Another solution previously proposed to avoid cold temperature embrittlement of a trim cover comprises fabricating the trim cover of a synthetic material, such as an impact-modified TPO and polyether-ester. While that material possesses desirable cold temperature properties, it tends to lose strength and dimensional stability at hot temperatures, such as ones approaching 70° C. and consequently may be poorly suited for certain trim cover applications.

The phrase "trim cover", or "trim panel", is being used here in a generic sense to include various parts that may be present within the interior of the passenger compartment of a motor vehicle. Some examples are "A"-pillar covers, "B"-pillar covers, roof rail covers, and instrument and dashboard panels, seat back side covers, and door trim panels.

In view of the state of the art, an improvement that would allow a trim cover to be fabricated in a cost-efficient manner using cost-efficient synthetic material, that would not require added accessory devices in the vehicle, such as electric heaters and associated electric wiring, and that would resist separation of fragments created as a result of deployment-induced fracture would seem quite desirable for the automotive industry.

SUMMARY OF INVENTION

It is toward providing such trim covers and trim panels that the present invention is directed.

Briefly, the invention comprises a laminated backing adhered directly to the rear, or inside, face of a synthetic trim cover. The laminated backing comprises a stretchable foam layer adhered directly to the trim cover and a non-tearable layer adhered in covering relation to the foam layer. The backing has a shape that takes into account the shape of the line of weakness along which the trim cover is intended to fracture as the restraint is being deployed so that the backing does not interfere with the intended fracture. The backing covers an area proximate the fracture line where fragmentation of the synthetic material may occur. Should portions of the trim cover fragment, the resulting fragments remain adhered to the backing, with the stretchable foam layer stretching to absorb energy released by separating fragments of the plastic while keeping the fragments adhered to the backing and with the non-tearable layer preventing the foam layer from fragmenting. In that way loose fragments are not scattered in the passenger compartment as a restraint is being deployed.

Several specific embodiments of the invention will be disclosed herein. While those embodiments possess a generic character in that the laminated backing comprises a stretchable foam layer adhered directly to the trim cover and a non-tearable layer adhered in covering relation to the foam layer, they differ in the particular materials that are employed.

Accordingly, one generic aspect of the present invention relates to a vehicle comprising a deployable passenger restraint system comprising a passenger restraint that is deployed through the wall of a trim cover fabricated of synthetic material that has a temperature-sensitive fragmentation characteristic. Deployment of the restraint creates an opening in the trim cover wall by fracturing the trim cover wall. A laminated backing disposed on a back face of the trim cover wall contains fragments of the wall resulting from its fracturing by the deploying restraint. The laminated backing comprises a stretchable foam layer having a front face adhered to the back of the wall and a non-tearable layer that has a front face adhered in covering relation to a back face of the stretchable foam layer and that does not tear as a result of the fracturing of the wall by the deploying restraint.

Another generic aspect of the present invention relates to a method of making a trim cover assembly having such a synthetic trim cover and laminated backing.

Still another generic aspect of the present invention relates such a trim cover assembly.

BRIEF DESCRIPTION OF DRAWINGS

The drawings that will now be briefly described are incorporated herein to illustrate a preferred embodiment of the invention and a best mode presently contemplated for carrying out the invention.

FIG. 3 is a perspective view of another example before an air bag that is being concealed by a trim cover embodying principles of the present invention has been deployed through the trim cover.

FIG. 4 is a side elevation view, in enlarged cross section, taken in the direction of arrows 4-4 in FIG. 3.

FIG. 5 is a perspective view related to FIG. 3 and showing relative placement of two laminated backings that are not visible in FIG. 3.

DETAILED DESCRIPTION

Various trim parts that are used in the interiors of passenger compartments of motor vehicles for covering underlying devices and/or body structures are molded from synthetic materials, i.e. plastics. Certain plastics, examples of which are high crystalline polypropylene, thermoplastic polyolefin (TPO), and polyether-ester, may be preferred for use in trim parts that cover deployable restraints, such as air bags, because they will fracture along lines of weakening that are designed into their geometries to create openings through which the restraints can pass during deployment, but at cold temperatures they may become brittle to such an extent that they may experience some degree of fragmentation upon fracture. It may therefore be appropriate to consider use of measures for avoiding low-temperature fragmentation of the plastic when air bags are deployed.

One such measure is the use of heaters, as discussed above. Another is the use of polyether-ester or impact-modified TPO which is less prone to low-temperature fragmentation upon impact. But at elevated temperatures impact-modified TPO may lose strength and dimensional stability, and that may disqualify it from being a suitable material for such applications.

The present invention contemplates continued use of synthetic materials such as high crystalline polypropylene, ABS, PC/ABS, nylon, TPO, polyether-ester, and other rigid thermoplastics, and various blends of such materials for these trim cover applications, but addresses the matter of possible fragmentation in a new and unique way.

Figure 1:
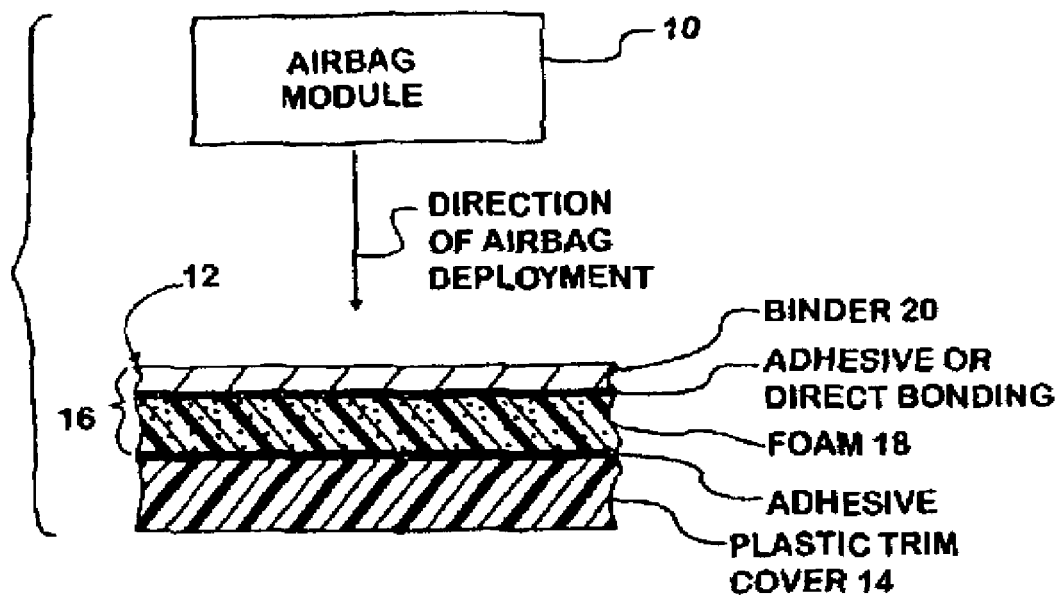
FIG. 1 is a general schematic diagram, partly in cross section, presenting generic principles of the invention.

FIG. 1 shows an air bag module 10 containing an air bag waiting to be deployed. A trim cover assembly 12 of suitable geometric shape and embodying principles of the invention is disposed in covering relation to module 10. Trim cover assembly 12 comprises a plastic trim cover 14 that provides a wall in front of module 10. That wall has a front face toward the interior of the passenger compartment of a motor vehicle and a back face to which a laminated backing 16 is adhered.

Backing 16 comprises a stretchable foam layer 18 adhered directly to the back face of the trim cover wall and a non-tearable layer, or binder layer, 20 adhered in covering relation to foam layer 18. Foam layer 18 and binder layer 20 may be united by adhesive or by direct bonding. Backing 16 has a shape that takes into account the shape of a line of weakness or character line along which the trim cover is intended to fracture as the restraint is being deployed so that the backing does not interfere with the intended fracture. The backing covers an area proximate the fracture line where fragmentation of the synthetic material of trim cover 14 may occur. The material of trim cover 14 is one that possess suitable dimensional stability and strength over a range of temperatures running from extreme cold to extreme heat but that may become brittle, and hence subject to fragmentation, at low temperatures when impacted by the deploying air bag.

Figure 2:
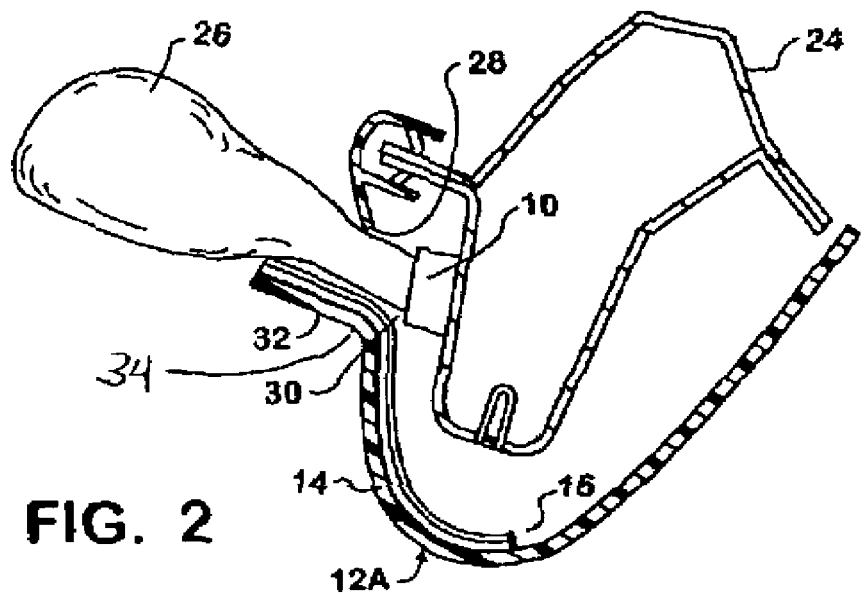
FIG. 2 is a side elevation view, in cross section, illustrating an example where an air bag has been deployed through a trim cover embodying principles of the present invention.

FIG. 2 shows a specific trim cover assembly 12A in covering relation to a portion of a body structural member such as a roof rail 24. An air bag module 10 is disposed on roof rail 24 behind a covering portion of trim cover assembly 12A and is shown to have been activated, causing its air bag 26 to be deployed through trim cover assembly 12A. As the deploying bag impacts the rear face of trim cover assembly 12A, the plastic trim cover 14 fractures along a line of weakness 28 to create an opening 30 through which the deploying bag can pass. The line of weakness runs along three sides of a rectangular zone in trim cover 14. The fourth side has a line of lesser weakness 34 that forms a hinge allowing the rectangular zone to form a flap or door 32 that swings down on the trim cover, as shown, to create opening 30. The drawing is also representative of member 24 being an "A-pillar" or "B-pillar" cover.

Backing 16 is adhered to the back face of trim cover 14 so as to cover door 32, the line of lesser weakness 34, and an adjoining portion of the trim cover, as shown. Should the plastic of trim cover 14 tend to fragment upon being struck by the deploying air bag, backing 16 will contain the fragments so that they will not separate and scatter into the interior of the passenger compartment.

The thickness of stretchable foam layer 18 is chosen to dispose non-tearable layer 20 at some distance from hinge line 34 so that stress concentrations in layer 20 are significantly attenuated from what they would be in the absence of foam layer 18. While the ability of foam layer 18 to stretch also favors stress reduction in non-tearable layer 20, the ability of a portion of the backing to stretch when the adhered plastic fragments is important in damping motion of the fragments away from each other as they separate from the trim cover. Hence, a certain synergy that is beneficial to fragment containment is provided by the two layers 18 and 20. It is believed that foam layer 18 should have a minimum thickness of 1.0 mm, and preferably a thickness of about 3.0 mm, for achieving the desired fragment containment upon restraint deployment.

Physical properties of an example of an acceptable foam, according to the corresponding ASTM method are:
 1) Density: 32-38 kgm/m3 (ASTM method D3574-A-95)
 2) Indentation Force Deflection (IFD)-25% deflection: 160.1-249 N (ASTM method D3574-B1-95)
 3) Tensile Strength, min.: 110 kPa (ASTM method D3574-E-95)
 4) Elongation, min.: 150% (ASTM method D3574-E-95)
 5) Tear Resistance: 350 N/M, min. (ASTM method D3574-F-95)
 6) Compression Set, 90% deflection, % of thickness loss, max.: 20% (ASTM method D3574-D-95)

It is believed that properties 3), 4), and 5) are most significant in attaining desired material performance.

FIGS. 3-5 show another example where the trim cover assembly 12B is an instrument panel or dash panel cover. A three-sided line of weakness 28 is present in the plastic trim cover, and the fourth side forms a hinge line 34. A first laminated backing 16A is adhered to the back face of trim cover 14 so as to cover door 32, hinge line 34, and an adjoining portion of the trim cover, as shown. A second laminated backing 16B, in the shape of a "U" is adhered to the back face of trim cover 14 to run coextensive with line 28 on the opposite side of line 28 from door 32 so that it will cover the margin of the opening 30 along line 28 when the trim cover is fractured along line 28 to create the opening as door 32 swings open about hinge line 34. In other words, backing 16B is a strip of generally uniform width that runs from a location at one end of the hinge line, around the margin of the opening, to an opposite end of the hinge line. Because of the presence of both backing parts 16A, 16B, any fragments created from material of either the door or the margin of the opening around the door will be contained by the corresponding backing 16A, 16B. While the line of weakness is shown in the rear, or interior, face of the trim cover, a character line in the front, or exterior, face could additionally or alternately provide a line of weakness.

Figure 6:
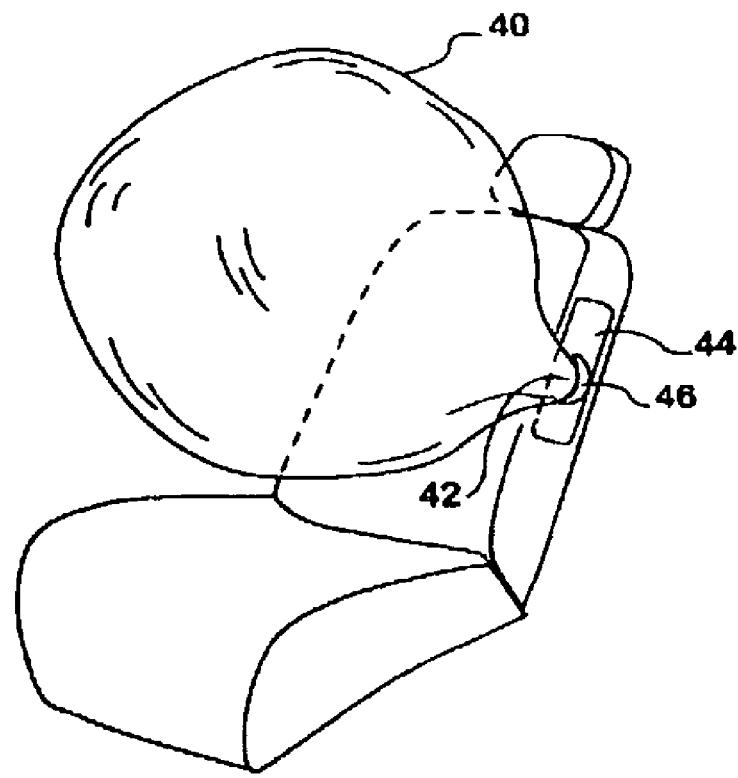
FIG. 6 is a perspective view of another example where a restraint has been deployed through a seat back side cover.

FIG. 6 shows a restraint 40 that has been deployed through an opening 42 created in a seat back side cover 44 upon a door 46, similar to door 32, swinging open as the restraint is being deployed. The door has a fragment-containing backing like that shown in FIG. 3-5.

Figure 7:
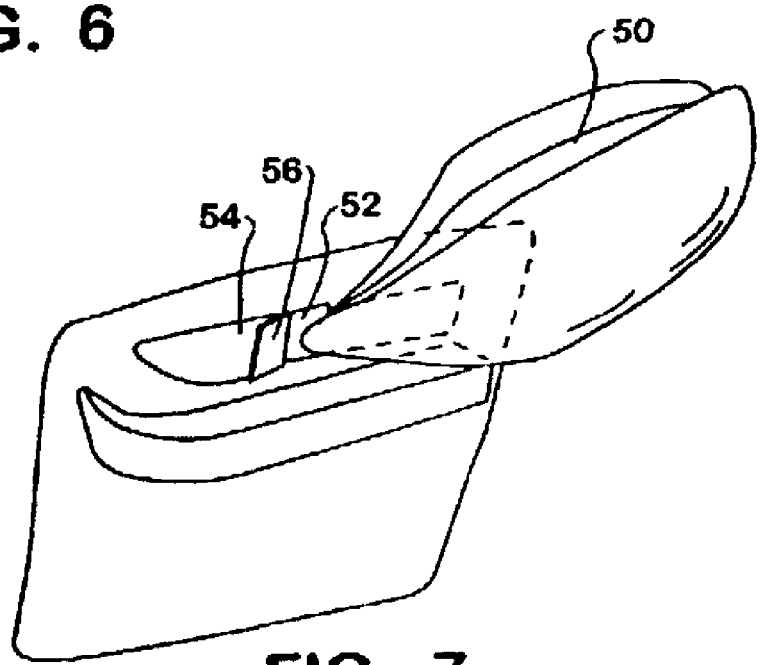
FIG. 7 is a perspective view of still another example where a restraint has been deployed through a door trim panel.

FIG. 7 shows a restraint 50 that has been deployed through an opening 52 created in a door trim panel 54 upon a door 56, similar to door 32, swinging open as the restraint is being deployed. The air bag door has a fragment-containing backing like that shown in FIG. 3-5.

The following three examples present specific constructions for the inventive trim cover assemblies.

EXAMPLE ONE

Automotive headliner face stock comprises woven fabric (the non-tearable layer) and 3 mm. thick polyether-urethane foam (the stretchable foam layer) laminated together face-to-face. The foam layer was bonded directly to the back face of a plastic trim cover using a typical laminate adhesive such as Fastbond 2000™ available from 3M Company, or equivalent. Adhesion of the laminate to the material of the trim cover may be enhanced by subjecting the face of the trim cover to plasma or corona discharge treatment prior to adhering the laminate.

EXAMPLE TWO

A woven fiberglass mat (the non-tearable layer) and 1 mm. thick polyester-urethane foam (the stretchable foam layer) were laminated together face-to-face. The foam layer was bonded directly to the back face of a plastic trim cover using a typical laminate adhesive such as Fastbond 2000™ available from 3M Company, or equivalent. Adhesion of the laminate to the material of the trim cover may be enhanced by subjecting the face of the trim cover to plasma or corona discharge treatment prior to adhering the laminate.

EXAMPLE THREE

Aluminum foil 0.1 mm. thick was adhered to one side of 1.0 mm. thick double-sided pressure-sensitive adhesive (PSA) polyester-urethane foam tape and the other side of the tape adhered to the back face of a trim cover. Adhesion of the tape to the material of the trim cover may be enhanced by subjecting the face of the trim cover to plasma or corona discharge treatment prior to adhering the laminate.

While a presently preferred embodiment has been illustrated and described, it is to be appreciated that the invention may be practiced in various forms within the scope of the following claims.

The invention claimed is:

1. A vehicle comprising:
   a deployable passenger restraint system comprising a passenger restraint that is deployed through a wall of a trim part fabricated of synthetic material that has a temperature-sensitive fragmentation characteristic, wherein deployment of the restraint creates an opening in the trim part wall by fracturing the trim part wall, with the trim part wall having a line of weakness that defines, in the trim part, a door that is swung open about a hinge line by the deploying restraint to create an opening through which the restraint deploys; and
   a laminated backing disposed on a back face of the trim part wall for containment of fragments of the wall resulting from its fracturing by the deploying restraint;
   wherein the laminated backing comprises a stretchable foam layer having a front face adhered to the back of the wall and a non-tearable layer that has a front face adhered in covering relation to a back face of the stretchable foam layer and that does not tear as a result of the fracturing of the wall by the deploying restraint.

2. A vehicle as set forth in claim 1 wherein the laminated backing comprises a first backing part that is adhered in covering relation to the door, the hinge line, and an adjoining portion of the trim part, and a second backing part that runs from a location at one end of the hinge line, around a margin of the opening, to an opposite end of the hinge line.

3. A vehicle as set forth in claim 1 wherein the non-tearable layer comprises a woven fabric.

4. A vehicle as set forth in claim 1 wherein the non-tearable layer comprises aluminum foil.

5. A vehicle as set forth in claim 4 wherein the stretchable foam layer comprises double-sided adhesive foam tape adhered to the aluminum foil.

6. A vehicle as set forth in claim 1 wherein the foam layer has a minimum thickness of 1.0 mm.

\* \* \* \* \*